United States Patent Office 3,144,476
Patented Aug. 11, 1964

3,144,476
SEPARATION OF DICHLORONITROBENZENES AND BENZONITRILE PRODUCTION
Pieter Ten Haken, Herne Bay, Kent, England, assignor to Shell Oil Company, New York, N.Y., a corporation of Delaware
No Drawing. Filed Feb. 21, 1962, Ser. No. 174,669
Claims priority, application Great Britain Mar. 6, 1961
6 Claims. (Cl. 260—465)

The invention relates to a process for the separation of isomers, in particular isomers of dihalonitrobenzenes.

Dihalonitrobenzenes are normally prepared under such conditions that a mixture of isomers is obtained. For example, when subjecting dichlorobenzene to nitration, a mixture is obtained comprising 2,3-dichloronitrobenzene and 3,4-dichloronitrobenzene. The separation of these isomers is normally carried out by elaborate physical methods which are costly and cumbersome.

The object of the present invention is, therefore, to provide a process according to which the above isomers can be easily separated from each other. Surprisingly, it has now been found that by reacting, for example, an isomeric mixture of 2,3-dihalonitrobenzene and 3,4-dihalonitrobenzene with a certain metal cyanide, only the 2,3-dihalonitrobenzene is converted into the corresponding nitrile, whereas the other isomer does not react and remains unchanged. By subjecting a mixture of 2,3- and 3,4-dihalonitrobenzene to the above reaction, only the 2,3-isomer will be converted into the corresponding nitrile whereas the 3,4-isomer will remain unchanged. The unreacted 3,4-dihalonitrobenzene can be easily separated from the nitriles formed, for example by steam distillation.

The present invention therefore particularly relates to a process for the separation of 2,3-dihalonitrobenzene and/or 2,5-dihalonitrobenzene from 3,4-dihalonitrobenzene, according to which such an isomeric mixture is reacted at an elevated temperature with cuprous cyanide and/or an alkali metal cyanide in the presence of a diluent or solvent comprising a tertiary amine, a dialkyl formamide and/or a dialkyl sulphoxide, whereupon the resulting halo-nitro-benzonitrile is separated from the unreacted isomer. The dihalonitrobenzenes are preferably dichloronitrobenzenes.

The process according to the invention is particularly suitable for the separation of an isomeric mixture of 2,3-dichloronitrobenzene and 3,4-dichloronitrobenzene. This latter mixture is obtained in actual practice by subjecting ortho-dichloronitrobenzene to nitration.

The alkali metal cyanide which may be used in the process according to the invention is preferably potassium or sodium cyanide. The diluent applied in the reaction may be a tertiary amine, in particular an aromatic amine, for example pyridine. Dialkyl carbonamides, in particular dimethylformamide, and dialkyl sulphoxides, in particular dimethyl sulphoxide, can also be very suitably used as reaction media according to the invention. The halogen in the dihalonitrobenzene compound may be chlorine, bromine, iodine or fluorine.

If desired, the reaction medium may, apart from the reaction media as referred to above, also contain an inert diluent, for example an aromatic hydrocarbon such as toluene or xylene, nitrobenzene or amides such as formamides or acetamides. Chlorobenzene may also be used as an inert diluent. The conversion of the 2,3-dihalonitrobenzene into 2-nitro-6-halobenzonitrile is carried out by heating the reaction components at a temperature lying in general between 150° and 250° C. Preferably, a temperature is applied lying between 125° and 200° C., conveniently by boiling under reflux. The heating is normally applied for a period of 1–20 hours, depending on the rate of reaction.

If desired, the reaction may be carried out under super- or sub-atmospheric pressure.

In general, the metal cyanide is used in an amount equimolar to the amount of 2,5- or 2,3-dihalonitrobenzene present in the isomeric mixture. However, it is possible to use larger amounts of the metal cyanide. The nitrile obtained according to the process of the invention, viz. 2-halo-6-nitrobenzonitrile, in the case that 2,3-dihalonitrobenzene is present in the isomeric mixture, is a suitable intermediate in the preparation of herbicides, for example of 2,6-dihalobenzonitrile.

The process according to the invention is illustrated in more detail in the following examples:

Example I

A mixture containing 9.28 grams (0.048 mol.) of 2:3-dichloronitrobenzene, 37.12 grams (0.1932 mol.) of 3:4-dichloronitrobenzene, 4.35 grams (0.0483 mol.) of cuprous cyanide and 19.1 ml. of dimethylformamide, is heated to 173° C. (gentle reflux) and kept at this temperature for 4½ hours in the course of which there is gradually added another 10 ml. of dimethylformamide in order to keep the reflux temperature at about 173° C.

The reaction mixture is then subjected to steam distillation. The steam volatile fraction amounts to 37 grams and consists of almost pure 3:4-dichloronitrobenzene. The non-volatile residue is extracted with hot benzene in a continuous extractor for three hours. The benzene extract on evaporation gives 8.1 grams of material consisting mainly of 2-chloro-6-nitrobenzonitrile.

Gas liquid chromatography shows that no isomeric nitriles have been formed.

|  | Percent |
|---|---|
| Conversion of 2:3-dichloronitrobenzene | 92 |
| Recovery of 3:4-dichloronitrobenzene | 99.7 |

Example II

A mixture containing 18.56 grams (0.0966 mol.) of 2:3-dichloronitrobenzene, 27.84 grams (0.1449 mol.) of 3:4-dichloronitrobenzene, 8.7 grams (0.0966 mol.) of cuprous cyanide and 19.1 mol. of dimethylformamide is heated to 173° C. (gentle reflux) and kept at this temperature for 4½ hours in the course of which there is gradually added another 10 ml. of dimethylformamide in order to keep the reflux temperature at about 173° C.

The reaction mixture is then subjected to steam distillation. The steam volatile fraction amounts to 28 grams and consists of almost pure 3:4-dichloronitrobenzene. The non-volatile residue is extracted with hot benzene in a continuous extractor for three hours. The benzene extract on evaporation gives 16.0 grams of material consisting mainly of 2-chloro-6-nitrobenzonitrile.

Gas liquid chromatography shows that no isomeric nitriles have been formed.

|  | Percent |
|---|---|
| Conversion of 2:3-dichloronitrobenzene | 90 |
| Recovery of 3:4-dichloronitrobenzene | 100 |

Example III 48 grams of a technical mixture containing 63% of 3:4-dichloronitrobenzene and 32% of 2:3-dichloronitrobenzene, 19.8 ml. of dimethyl formamide and 9 grams of cuprous cyanide (0.10 mol.) are heated to 173° C. (gentle reflux) and kept at this temperature for 4½ hours in the course of which there is gradually added another 10 ml. of dimethyl formamide in order to keep the reflux temperature at about 173° C.

The reaction mixture is then subjected to steam distillation. The steam volatile fraction amounts to 28.7 grams and consists of almost pure 3:4-dichloronitrobenzene. The non-volatile residue is extracted with hot benzene in a continuous extractor for three hours. The benzene extract on evaporation gives 13.3 grams of material consisting mainly of 2-chloro-6-nitrobenzonitrile.

Gas liquid chromatography shows that no isomeric nitriles have been formed.

|  | Percent |
|---|---|
| Conversion of 2:3-dichloronitrobenzene | 91 |
| Recovery of 3:4-dichloronitrobenzene | 95 |

*Example IV*

144 grams of a technical mixture containing 63% of 3:4-dichloronitrobenzene and 32% of 2:3-dichloronitrobenzene were heated to 165°–170° C. In the course of 3½ hours there was added a mixture of 27.0 grams (0.3 mol.) of cuprous cyanide and 3 ml. of pyridine. After the addition is completed, heating is continued for another ½ hour. The mixture is then poured into 375 ml. of hot chloroform and the solids are filtered off after some minutes and extracted with hot benzene in a continuous extractor for three hours. The chloroform and the benzene solutions are combined and twice extracted with 50 ml. of conc. HCl solution followed by enough water washings to render the solution neutral.

The residue obtained after driving off the solvents is extracted five times with 50 ml. portions of petroleum ether, B.P. 40–60. The residue from this operation amounts to 15 grams consisting mainly of 2-chloro-6-nitrobenzonitrile. The petroleum ether extracts on evaporation give 110 grams of material containing about 24% of 2:3-dichloronitrobenzene, the remainder being the 3:4 isomer.

Gas liquid chromatography shows that no isomeric nitriles have been formed.

|  | Percent |
|---|---|
| Conversion of 2:3-dichloronitrobenzene | 34.3 |
| Recovery of 2:3-dichloronitrobenzene | 61.4 |
| Recovery of 3:4-dichloronitrobenzene | 99 |

*Example V*

144 grams of a technical mixture containing 63% of 3:4-dichloronitrobenzene and 32% of 2:3-dichloronitrobenzene were heated to 165°–170° C. In the course of 3½ hours there was added a mixture of 13.5 grams (0.15 mol.) of cuprous cyanide, 9.8 grams (0.15 mol.) of potassium cyanide and 6 ml. of pyridine. After the addition is completed, heating is continued for another ½ hour. The mixture is then poured into 375 ml. of hot chloroform and the solids are filtered off after some minutes and extracted with hot benzene in a continuous extractor for three hours. The chloroform and the benzene solutions are combined and twice extracted with 50 ml. of conc. HCl solution followed by enough water washings to render the solutions neutral.

The residue obtained after driving off the solvents is extracted five times with 50 ml. portions of petroleum ether (40–60°). The residue from this operation amounts to 25 grams consisting mainly of 2-chloro-6-nitrobenzene. The petroleum ether extracts on evaporation give 1118 grams of material, containing about 16.8% of 2:3-dichloronitrobenzene, the remainder being the 3:4 isomer.

|  | Percent |
|---|---|
| Conversion of 2:3-dichloronitrobenzene | 57.3 |
| Recovery of 2:3-dichloronitrobenzene | 39.3 |
| Recovery of 3:4-dichloronitrobenzene | 99 |

Gas liquid chromatography showed that no isomeric nitriles had been formed.

Typical dihalonitrobenzenes which may be separated by the process of the present invention include, for example, 2,3-dichloronitrobenzene and 3,4-dichloronitrobenzene, 2,3-dibromonitrobenzene and 3,4-dibromonitrobenzene, 2,3-diiodonitrobenzene and 3,4-diiodonitrobenzene and 2,3-difluoronitrobenzene and 3,4-difluoronitrobenzene.

I claim as my invention:

1. A process for the selective separation of an isomeric mixture of 2,3-dihalonitrobenzene and 3,4-dihalonitrobenzene which comprises reacting said isomeric mixture with cuprous cyanide in about equimolar proportions to the 2,3-isomer, in the presence of an organic diluent, selected from the group consisting of tertiary amine, dialkyl formamide and dialkyl sulfoxide, the reaction occurring at about 125° C. to about 200° C. during a period of 1 to 20 hours, and thereafter separating by vaporization the volatile unreacted 3,4-dihalonitrobenzene from the resulting non-volatile residue of 2-halo-6-nitrobenzonitrile.

2. A process in accordance with claim 1 in which an alkali metal cyanide selected from the group consisting of potassium cyanide and sodium cyanide is also present in the reaction mixture.

3. A process in accordance with claim 1 in which the vaporization is effected by steam distillation.

4. A process in accordance with claim 3 in which the dihalonitrobenzenes are dichloronitrobenzenes.

5. A process in accordance with claim 4 in which the organic diluent is dimethylformamide.

6. A process in accordance with claim 4 in which the organic diluent is pyridine.

References Cited in the file of this patent

FOREIGN PATENTS 861,898     Great Britain     Mar. 1, 1961

OTHER REFERENCES

Brewin et al.: Journal of Chemical Society (London), 1928, pp. 334–337.